(12) United States Patent
Miwa

(10) Patent No.: US 8,744,425 B2
(45) Date of Patent: Jun. 3, 2014

(54) MOBILE TERMINAL APPARATUS

(75) Inventor: Tomoaki Miwa, Osaka (JP)

(73) Assignee: KYOCERA Corporation, Kyoto (JP)

( * ) Notice: Subject to any disclaimer, the term of this patent is extended or adjusted under 35 U.S.C. 154(b) by 168 days.

(21) Appl. No.: 13/165,524

(22) Filed: Jun. 21, 2011

(65) Prior Publication Data

US 2011/0319128 A1 Dec. 29, 2011

(30) Foreign Application Priority Data

Jun. 25, 2010 (JP) ................. 2010-145473

(51) Int. Cl.
- *H04M 3/00* (2006.01)
- *H04M 1/00* (2006.01)
- *H04M 1/60* (2006.01)

(52) U.S. Cl.
CPC ........ *H04M 1/6008* (2013.01); *H04M 2250/12* (2013.01)
USPC ....................... 455/418; 455/569.1

(58) Field of Classification Search
USPC ........ 455/565, 569.1–570, 575.6, 414.1, 418; 379/421
See application file for complete search history.

(56) References Cited

U.S. PATENT DOCUMENTS

| | | | |
|---|---|---|---|
| 7,142,666 B1 * | 11/2006 | Bates et al. | 379/421 |
| 7,633,076 B2 | 12/2009 | Huppi et al. | |
| 2007/0075965 A1 | 4/2007 | Huppi et al. | |
| 2007/0293159 A1 * | 12/2007 | Etelapera | 455/73 |
| 2009/0060240 A1 | 3/2009 | Coughlan et al. | |
| 2009/0305742 A1 | 12/2009 | Caballero et al. | |
| 2010/0048256 A1 * | 2/2010 | Huppi et al. | 455/574 |
| 2011/0086626 A1 * | 4/2011 | Kerr | 455/418 |

FOREIGN PATENT DOCUMENTS

| | | |
|---|---|---|
| JP | S61-258550 A | 11/1986 |
| JP | H07-099535 A | 4/1995 |
| JP | H09-247260 A | 9/1997 |
| JP | 2003-037651 A | 2/2003 |
| JP | 2003-224655 A | 8/2003 |
| JP | 2003-309644 A | 10/2003 |
| JP | 2006-303659 A | 11/2006 |
| JP | 2007-081460 A | 3/2007 |
| JP | 2009-065669 A | 3/2009 |
| JP | 2010-507870 A | 3/2010 |
| WO | 2009/149023 A1 | 12/2009 |

OTHER PUBLICATIONS

An Office Action; "Notice of Reasons for Rejection," issued by the Japanese Patent Office on Oct. 29, 2013, which corresponds to Japanese Patent Application No. 2010-145473 and is related to U.S. Appl. No. 13/165,524; with Concise Explanation.

Japanese Office Action; JP2010-145473; Mar. 18, 2014; with concise explanation.

* cited by examiner

*Primary Examiner* — George Eng
*Assistant Examiner* — Nam Huynh
(74) *Attorney, Agent, or Firm* — Studebaker & Brackett PC

(57) ABSTRACT

A mobile terminal apparatus includes: a microphone; a switch control unit, which switches between a normal mode, in which a voice uttered toward the microphone is transmitted to an intended party, and a mute mode, in which the voice is not transmitted to the intended party; and a proximity sensor, which detects whether a detection object is in proximity to the proximity sensor, wherein, while the mute mode is being executed, if the detection object is detected by the proximity sensor, the switch control unit switches to the normal mode.

9 Claims, 13 Drawing Sheets

MOBILE TERMINAL APPARATUS

CROSS-REFERENCE TO RELATED APPLICATION

This application claims priority from Japanese Patent Application No. 2010-145473 filed on Jun. 25, 2010, the entire subject matter of which is incorporated herein by reference.

BACKGROUND

The present invention relates to a mobile terminal apparatus such as a mobile phone, a personal digital assistant (PDA), etc.

Mobile terminal apparatus such as a mobile phone according to the related art have a mute function. For example, if a mute key is pushed during a telephone call, a mute mode is executed. In the mute mode, for example, a microphone is in an OFF state so that a voice is not transmitted to an intended party. If a release key (which may be configured by the mute key) is pushed, the mute mode is released to return to a state in which a voice is to be transmitted to the intended party.

As described above, when the mute mode is released by key operation by a user, the user is likely to forget the key operation so that the user should tell the intended party the same contents twice.

Meanwhile, it is possible to use a configuration for switching to the mute mode without key operation, for example, a configuration in which a contact detecting unit for detecting a contact of a finger is disposed in the vicinity of a microphone, and the mute mode is executed while a contact of finger is being detected by the contact detecting unit (see JP 2007-081460 A).

SUMMARY

However, in the case of the configuration for detecting a contact of a finger to perform switching to the mute mode, if another operation is performed in the mute mode, since the finger should be maintained to be in contact, the another operation is difficult and operability is not sufficient.

The present invention was made in consideration of the problems, and the present invention is to provide a mobile terminal apparatus configured to surely restarting a telephone call, even when a mute mode is being executed.

A mobile terminal apparatus according to the present invention includes: a microphone; a switch control unit, which switches between a normal mode, in which a voice uttered toward the microphone is transmitted to an intended party, and a mute mode, in which the voice is not transmitted to the intended party; and a proximity sensor, which detects whether a detection object is in proximity to the proximity sensor, wherein, while the mute mode is being executed, if the detection object is detected by the proximity sensor, the switch control unit switches to the normal mode.

With the mobile terminal apparatus according to the present invention, in order to restart the telephone call with the intended party, the user has only to bring the mobile phone in proximity to the ear. Then, the mute mode is automatically released so that the mobile phone is switched to the normal mode. Therefore, it is possible to suppress that the mute mode is being kept in restarting the telephone call. Further, since the user can freely use fingers even in the mute mode, the user can easily perform other forms of operation.

According to the present invention, it is possible to provide a mobile terminal apparatus capable of improving operability and surely restarting the telephone call even when the mute mode is being executed.

The effects and significance of the present invention will become further clarified by the following description of illustrative embodiments. However, the following illustrative embodiments are just examples, and the present invention is not limited to the illustrative embodiments.

DETAILED DESCRIPTION OF THE PRESENT INVENTION

Figure 1C:
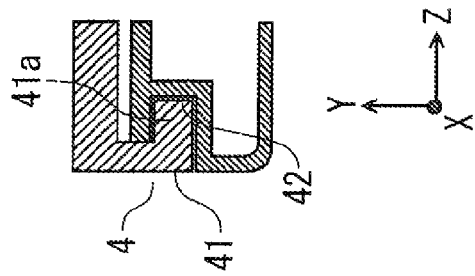
FIGS. 1A, 1B, and 1C are configuration views illustrating an appearance of a mobile phone according to an illustrative embodiment.
Figure 1A:
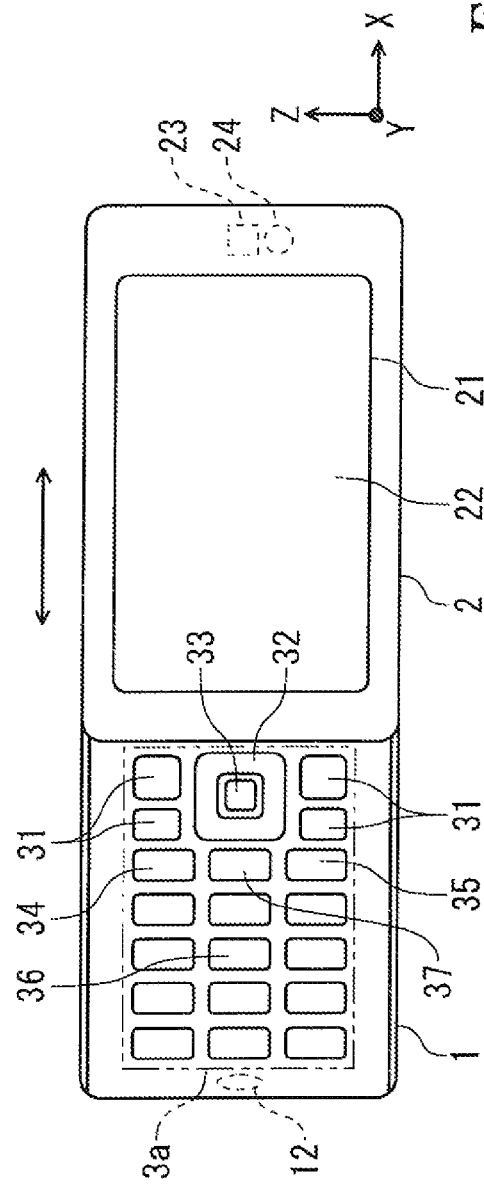
Figure 1B:
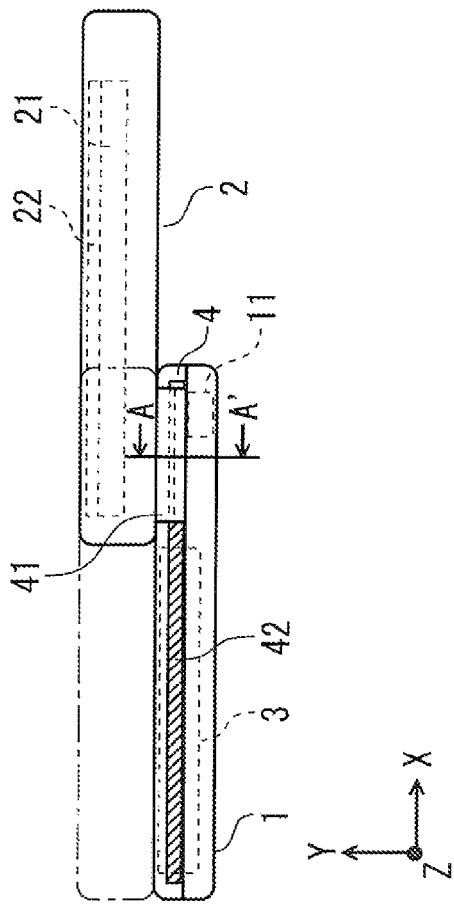

Hereinafter, the mobile terminal apparatus according to an illustrative embodiment will be described with reference to the drawings. FIGS. 1A to 1C are configuration views illustrating an appearance of a mobile phone. FIG. 1A is a front view illustrating the mobile phone with opening a second cabinet 2, and FIG. 1B is a side view illustrating the same state as FIG. 1A. FIG. 1C is a cross-sectional view taken along a line A-A' of FIG. 1B.

The mobile phone includes a first cabinet 1 and the second cabinet 2. The first cabinet 1 includes a key input unit 3. The key input unit 3 detects various operation inputs to the mobile phone.

In the top surface of the first cabinet 1, an operation key group 3a configures the key input unit 3. The operation key group 3a includes four start keys 31, a cursor key 32, an enter key 33, a call key 34, a call termination key 35, twelve ten-keys 36, and a clear key 37.

The start keys 31 are generally operated to start specific applications such as an electronic-mail function, a telephone directory function, a web function, and the like. The cursor key 32 is generally operated to select a desired menu from various menus displayed on a display 21. The enter key 33 is generally operated to determine the selected menu or agree to (or okays) contents displayed on the display 21. The call key 34 is generally operated to start a call, and the call termination key 35 is generally operated to terminate a call. The ten-keys 36 are generally operated to input characters, numbers, and symbols. The clear key 37 is generally operated to erase input characteristics and the like. Meanwhile, a part of functions of the ten-keys 36 may be implemented by QWERTY keys or the like.

The first cabinet 1 includes a camera module 11. A lens window (not shown) of the camera module 11 faces a rear surface of the first cabinet 1, and the camera module 11 receives an image of a photographic subject through the lens window.

The second cabinet 2 includes the display 21. The display 21 includes a liquid crystal panel 21a and a panel backlight 21b for illuminating the liquid crystal panel 21a as will be described below. Meanwhile, the display 21 may be configured by another display element such as an organic electroluminescent (EL) element or the like.

A touch sensor 22 is disposed on the display-surface side of the display 21, The touch sensor 22 has a transparent sheet fashion, and the display surface of the display 21 can be seen through the touch sensor 22.

The touch sensor 22 includes first transparent electrodes and a second transparent electrode arranged in a matrix (not shown). The touch sensor 22 detects a change in the capacitance between the first transparent electrodes and the second transparent electrode to detect a user contact position on the display surface, and outputs a position signal corresponding to the user contact position. Meanwhile, the touch sensor 22 is not limited to a capacitive touch sensor but may be configured by an ultrasonic touch sensor, a pressure-sensitive touch sensor, or the like.

The first cabinet 1 includes a microphone 12, and the second cabinet 2 includes a call speaker 23. The user can conduct a telephone call by bringing the call speaker 23 into proximity to user's ear and bringing the microphone 12 into proximity to user's mouth.

In the vicinity of the call speaker 23, a proximity sensor 24 is disposed. The proximity sensor 24 may be a capacitive proximity sensor. The proximity sensor 24 detects the capacitance, which will increases as a detection object (such as a user's ear or the like) approaches the proximity sensor 24, and outputs a detection signal when the capacitance exceeds a threshold value. Meanwhile, the proximity sensor 24 is not limited to the capacitive proximity sensor, but may be configured by an ultrasonic proximity sensor, an inductive proximity sensor, etc.

The second cabinet 2 is joined with the first cabinet 1 to be slidable in an X-axis of FIG. 1C by a slide mechanism portion 4. As shown in FIG. 1C, the slide mechanism portion 4 includes guide plates 41 and guide grooves 42. The guide plates 41 are provided on both end portions (left and right end portions) of the rear surface of the second cabinet 2, and have protrusions 41a formed in lower ends. The guide grooves 42 are formed in side surfaces of the first cabinet 1 along a slide direction (the X-direction of FIG. 1C). The protrusions 41a of the guide plates 41 are in engagement with the guide grooves 42.

In a closed state of the mobile phone, as shown in FIG. 1B by a dashed-dotted line, the second cabinet 2 almost completely overlaps the first cabinet 1. In this state (closed state), all keys of the operation key group 3a are hidden behind the second cabinet 2. The second cabinet 2 can slide until the guide plates 41 reach end positions of the guide plates 41 (to be an open state). If the second cabinet 2 is completely opened, as shown in FIG. 1A, all keys of the operation key group 3a are exposed to the outside.

In a state in which all keys are hidden, operation inputs to the mobile phone can be performed by the touch sensor 22. In this case, a soft key image is displayed at a predetermined position on the display surface of the display 21.

Meanwhile, the other operation keys different from the operation key group 3a may be provided on positions, for example, side surfaces of the first cabinet 1, to operate externally even when the second cabinet 2 is completely closed. In this case, even when the second cabinet 2 is in a completely closed state, the other operation keys can be used to perform desired operation.

Figure 2:
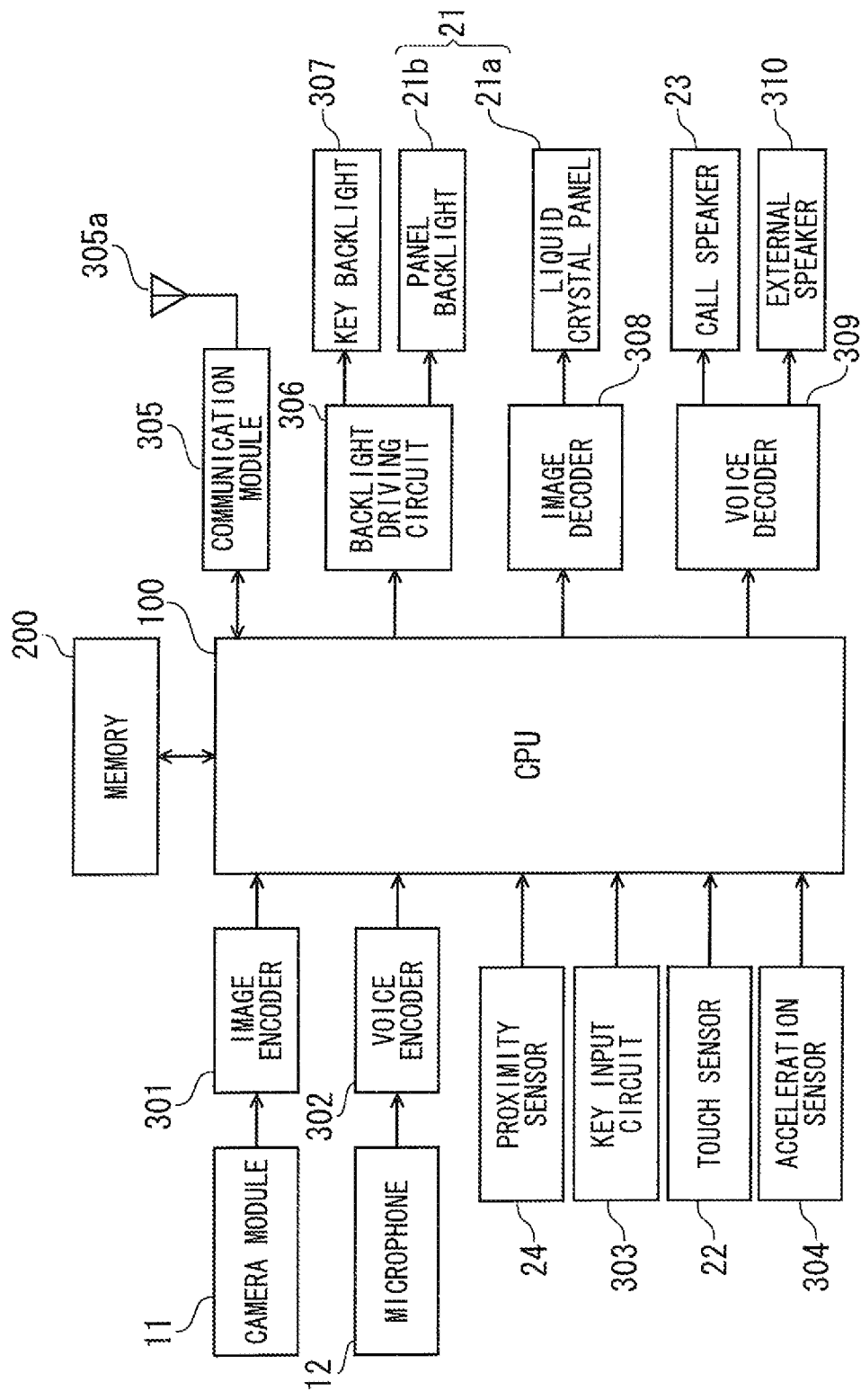
FIG. 2 is a block diagram illustrating an entire configuration of the mobile phone according to the illustrative embodiment.

FIG. 2 is a block diagram illustrating an entire configuration of the mobile phone. The mobile phone according to the illustrative embodiment includes not only the above-mentioned components but also a CPU 100, a memory 200, an image encoder 301, a voice encoder 302, a key input circuit 303, an acceleration sensor 304, a communication module 305, a backlight driving circuit 306, a key backlight 307, an image decoder 308, a voice decoder 309, and an external speaker 310.

The camera module 11 includes an imaging element such as a CCD. The camera module 11 digitalizes an image signal output from the imaging element, performs various kinds of correction such as gamma correction on the image signal, and outputs the image signal to the image encoder 301. The image encoder 301 encodes the image signal from the camera module 11, and outputs the encoded image signal to the CPU 100.

The microphone 12 converts a collected voice into an analog voice signal and outputs the analog voice signal to the voice encoder 302. The voice encoder 302 converts the analog voice signal from the microphone 12 into a digital voice signal, encodes the digital voice signal, and outputs the encoded digital voice signal to the CPU 100.

The key input circuit 303 outputs, to the CPU 100, an input signal corresponding to each key of the operation key group 3a when the corresponding key is operated.

The acceleration sensor 304 is a tri-axial acceleration sensor, and the acceleration sensor 304 is provided to detect accelerations in the X direction, Y direction, and Z direction of FIG. 1A. The acceleration sensor 304 outputs acceleration signals corresponding to the detected accelerations to the CPU 100.

The communication module 305 converts a voice signal, an image signal, a text signal, etc., from the CPU 100 into a radio signal, and transmits the radio signal to a base station through an antenna 305a. Also, the communication module 305 converts a radio signal received through the antenna 305a into a voice signal, an image signal, a text signal, etc., and transmits the converted signal to the CPU 100.

The backlight driving circuit 306 supplies a voltage signal, corresponding to a control signal from the CPU 100, to the key backlight 307 and the panel backlight 21b. The key backlight 307 is turned on by the voltage signal from the backlight driving circuit 306, so as to illuminate the individual keys of the operation key group 3a. The panel backlight 21b is turned on by the voltage signal from the backlight driving circuit 306, so as to illuminate the liquid crystal panel 21a.

The image decoder 308 converts an image signal from the CPU 100 into an analog or digital image signal to be displayable by the liquid crystal panel 21a and outputs the analog or digital image signal to the liquid crystal panel 21a. The liquid crystal panel 21a displays an image corresponding to the image signal on the display surface.

The voice decoder 309 decodes a voice signal from the CPU 100, converts the voice signal into an analog voice signal, and outputs the analog voice signal to the call speaker 23. Also, the voice decoder 309 decodes tone signals of various annunciation tones such as a ring tone, alarm tones, etc., from the CPU 100, converts the decoded tone signals into analog tone signals, and outputs the analog tone signals to the external speaker 310. The call speaker 23 regenerates the voice from the voice signal from the voice decoder 309. The external speaker 310 regenerates the ring-tone or the like from the voice decoder 309.

The memory 200 includes a ROM and a RAM. In the memory 200, a control program to provide a control function to the CPU 100 is stored. The memory 200 also stores image data imaged by the camera module 11, image data and text data (mail data) received from the outside through the communication module 305, etc., in predetermined file formats.

The CPU 100 operates the camera module 11, the microphone 12, the communication module 305, the liquid crystal panel 21a, the call speaker 23, the external speaker 310, etc., based on the operation input signals from the key input circuit 303 and the touch sensor 22 and the control program, thereby performing various functions (applications) such as a call function, an electronic-mail function, etc.

The mobile phone according to the illustrative embodiment has an automatic mute function. The user can set the automatic mute function to ON or OFF in a setting mode for performing various kinds. If the automatic mute function is set to ON, during telephone call, if the user keeps the mobile phone away from the ear, the mobile phone is automatically switched to a mute mode. If the mobile phone is switched to the mute mode, the microphone 12 is turned off so that any voice is not input from the microphone 12, and thus the user's voice is not transmitted to the intended party. Meanwhile, if the user brings the mobile phone into proximity to the ear again, the mute mode is automatically released and the mobile phone is switched to a normal mode.

Here, the mute mode means a state, in which the microphone 12 is in an OFF state so that a voice input is impossible, and thus the voice of the user is not transmitted to the intended party. In contrast with the mute mode, the normal mode means a state, in which the microphone 12 is in an ON state so that a voice input is possible, and thus the voice of the user is transmitted to the intended party.

Figure 3:
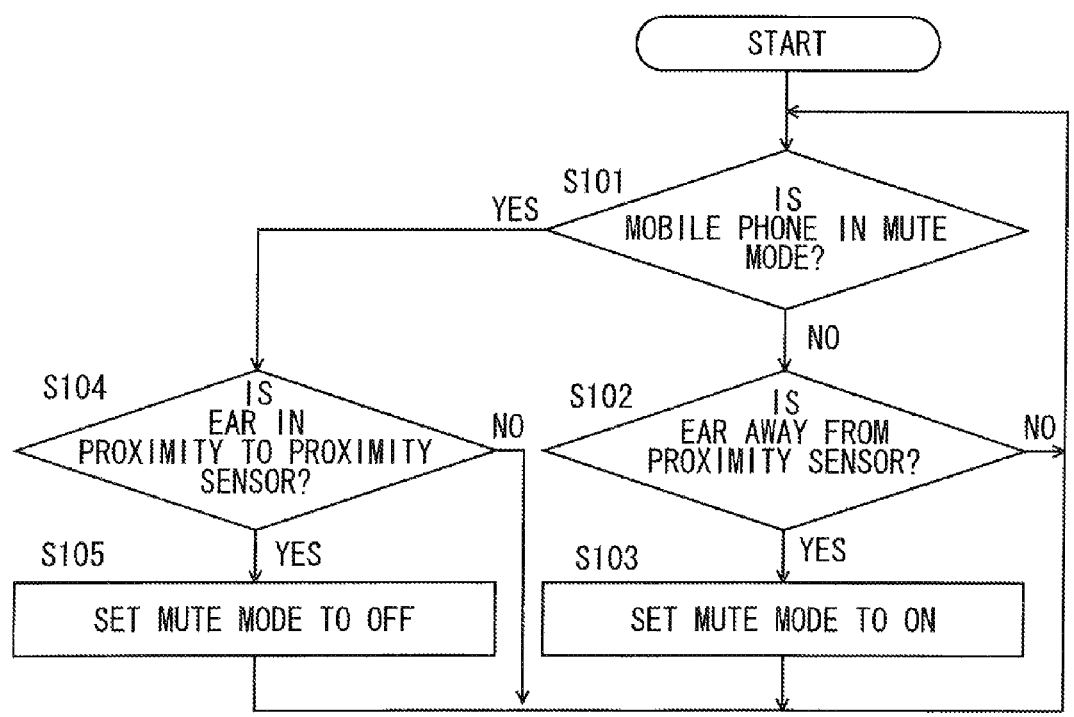
FIG. 3 is a flow chart illustrating a process sequence of control processes of an automatic mute function according to the illustrative embodiment.

FIG. 3 is a flow chart illustrating a process sequence of control processes of the automatic mute function.

If an incoming call is received and the call key 34 is operated, a telephone call starts. During the telephone call, the CPU 100 outputs voice data input from the voice decoder 309 to the communication module 305, and transmits the voice data from the communication module 305. Also, the CPU 100 outputs voice data input from the communication module 305 to the voice decoder 309, and outputs the voice data through the call speaker 23.

During a period from the start of telephone call to the first detection of the user's ear by mobile phone, the control processes of the automatic mute function do not start, and thus the mobile phone is not switched to the mute mode even when the mobile phone is taken away from the ear. Therefore, it is possible to suppress that the mute mode is being executed during the start of the telephone call against the intension of the user.

If the mobile phone detects that the ear is brought in proximity to the proximity sensor 24 and thus an ON signal is output from the proximity sensor 24, the control process of the automatic mute function is started.

Meanwhile, the term "starting a telephone call" means not only pushing the call key 34 when an incoming call is received but also pushing the call key 34 after inputting a phone number of a person, who the user will speak to, to make a call.

First, the CPU 100 determines whether the mobile phone is in the mute mode or not (step S101). Since the mobile phone is not initially in the mute mode as described above (No, in step S101), the CPU 100 determines whether the ear is taken away from the proximity sensor 24 or not (step S102). If a detection signal is output from the proximity sensor 24, the CPU 100 determines that the ear is not away from the proximity sensor 24 (No, in step S102), and keeps the normal mode. Therefore, a voice input to the microphone 12 is transmitted to a mobile phone of an intended party.

When the user want to interrupt the telephone call with the intended party for a moment and to avoid that the voice from the microphone 12 is transmitted to the intended party for that moment, the user keeps the mobile phone away from the ear. Then, the proximity sensor 24 is taken away from the ear so as not to output any detection signal.

If any detection signal is not output from the proximity sensor 24, the CPU 100 determines in step S102 that the ear is being taken away from the proximity sensor 24 (Yes, in step S102), and switches the mobile phone to the mute mode (step S103). That is, the CPU 100 turns off the microphone 12. Therefore, any voice input from the microphone 12 is not transmitted to the mobile phone of the intended party.

If the mobile phone is switched to the mute mode, the CPU 100 determines in step S101 that the mobile phone is in the mute mode (Yes, in step S101), and then determines whether the ear is in proximity to the proximity sensor 24 or not (step S104). If any detection signal is not output from the proximity sensor 24, the CPU 100 determines that the ear is not in proximity to the proximity sensor 24 (No, in step S104) and keeps the mute mode.

When the user want to restart the telephone call with the intended party, the user brings the mobile phone into proximity to the ear again. Then, if the ear of the user is in proximity to the proximity sensor 24, a detection signal is output from the proximity sensor 24.

If the detection signal is output from the proximity sensor 24, the CPU 100 determines in step S104 that the ear is in proximity to the proximity sensor 24 (Yes, in step S104), and releases the mute mode (step S105). That is, the CPU 100 turns on the microphone 12. Therefore, the mobile phone is switched to the normal mode so that the voice input from the microphone 12 is transmitted to the mobile phone of the intended party.

In this way, the CPU 100 performs the control processes of the automatic mute function is operated to terminate the call until the call termination key 35.

As described above, according to the illustrative embodiment, in order to restart the telephone call with the intended party, the user has only to bring the mobile phone into proximity to the ear. Then, the mute mode is automatically released so that the mobile phone is switched to the normal mode. Therefore, it is possible to suppress that the mute mode is being kept in restarting the telephone call. Further, since the user can freely use own fingers in the mute mode, the user can easily perform other operations.

Moreover, according to the illustrative embodiment, if the user keeps the mobile phone away from the ear, the mobile phone is automatically switched to the mute mode. Therefore, operation for switch to the mute mode is easy.

First Modified Embodiment

Figure 4:
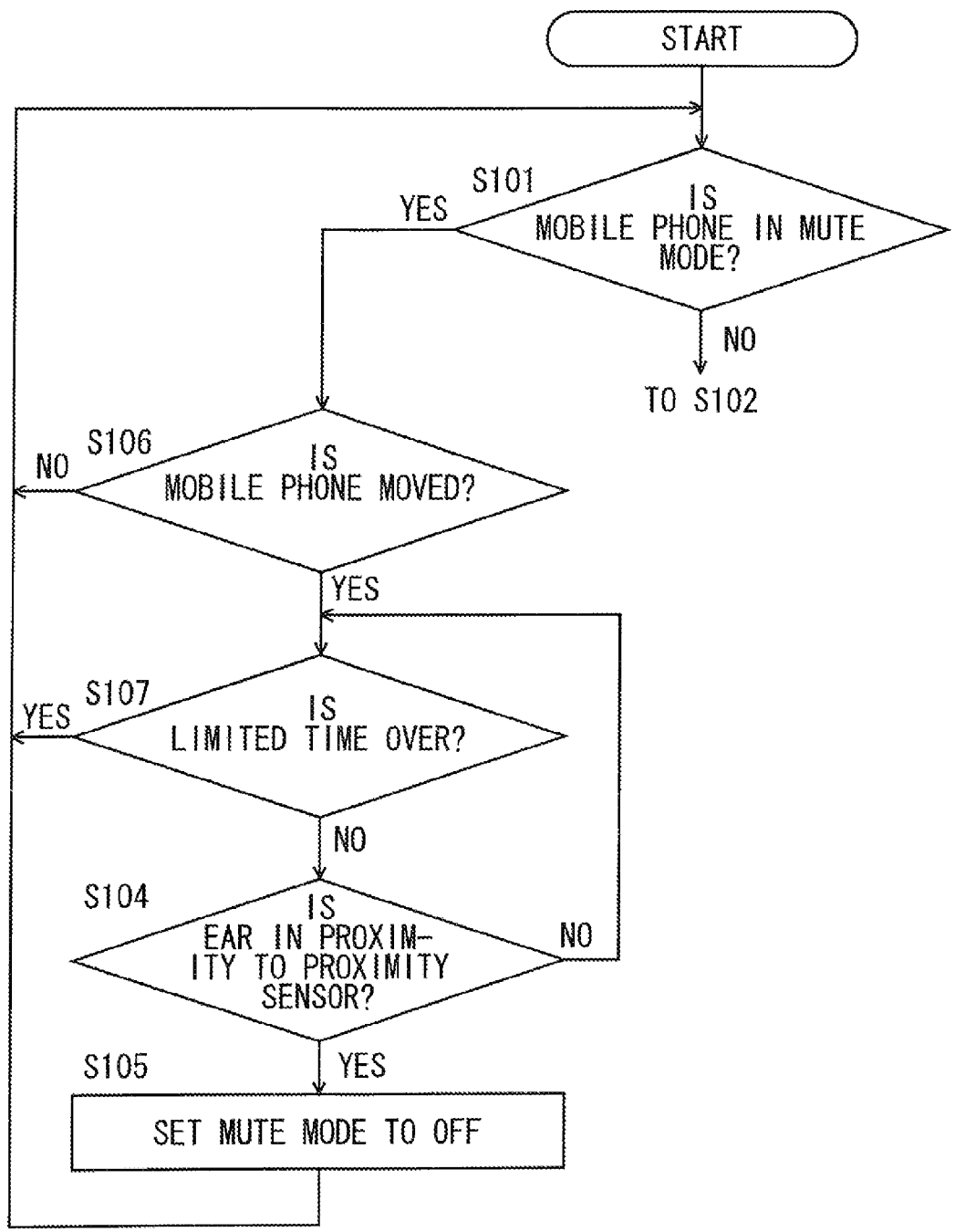
FIG. 4 is a flow chart illustrating a process sequence of control processes of an automatic mute function according to a first modified embodiment.

FIG. 4 is a flow chart illustrating a process sequence of control processes of an automatic mute function according to a first modified embodiment. Meanwhile, in the flow chart of FIG. 4, the same processes as those in the illustrative embodiment are denoted by identical step numerals. Further, the same steps S102 and S103 as those in the illustrative embodiment are omitted in FIG. 4.

In the first modified embodiment, control processes for switching from the normal mode to the mute mode are different from the illustrative embodiment.

If CPU 100 determines in step S101 that the mobile phone is in the mute mode (Yes, in step S101), the CPU 100 determines whether the mobile phone has moved or not (step S106). For example, the CPU 100 obtains three-axial acceleration signals from the acceleration sensor 304. When the mobile phone has moved, in an initial stage of the movement, at least one of the three-axial acceleration signals changes greatly. If a change in any one speed of acceleration exceeds a predetermined threshold value, the CPU 100 determines that the mobile phone has moved. In this case, the threshold value is set so that it should not be determined that the mobile phone has moved against the intension of the user when the user holds the mobile phone and the mobile phone slightly moves.

In a case that the user brings the mobile phone into proximity to the ear, the ear is in proximity to the proximity sensor 24 immediately after the mobile phone moves. If the CPU determines that the mobile phone has moved (Yes, in step S106), the CPU 100 determines whether the ear has come into proximity to the proximity sensor 24 in a predetermined limited time (step S107). For this determination, time counting is performed by a timer built in the CPU 100 after the mobile phone stopped.

If the ear has come into proximity to the proximity sensor 24 (No, in step S107 and Yes, in step S104), the CPU 100 releases the mute mode (step S105).

Meanwhile, even when a hand or a finger accidentally comes into proximity to the proximity sensor 24 while the user holds the mobile phone, since the CPU 100 determines that the mobile phone had not moved, the mute mode is not released.

As described above, according to the configuration of the first modified embodiment, since the mute mode is released only when the mobile phone has moved before the proximity sensor 24 is positioned in proximity to the ear, it is difficult for the mute mode to be accidentally executed.

Second Modified Embodiment

Figure 5:
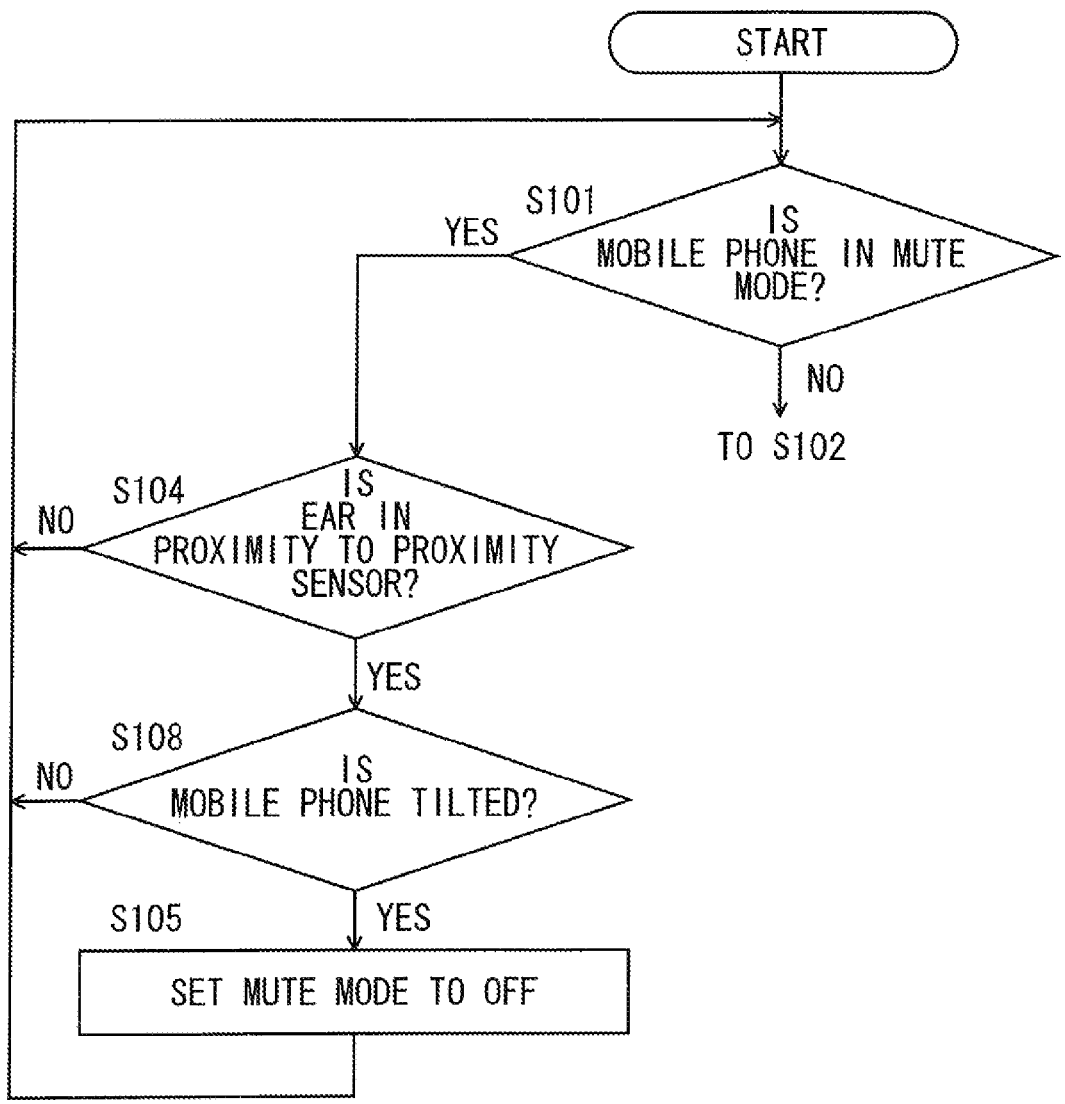
FIG. 5 is a flow chart illustrating a process sequence of control processes of an automatic mute function according to a second modified embodiment.

FIG. 5 is a flow chart illustrating a process sequence of control processes of an automatic mute function according to a second modified embodiment. Meanwhile, in the flow chart of FIG. 5, the same processes as those in the illustrative embodiment are denoted by identical step numerals. Further, the same steps S102 and S103 as those in the illustrative embodiment are omitted in FIG. 5.

Like the first modified embodiment, in the second modified embodiment, control processes for switching from the normal mode to the mute mode are different from the illustrative embodiment.

If the CPU 100 determines in step S101 that the mobile phone is in the mute mode (Yes, in step S101) and determines in step S104 that the ear is in proximity to the proximity sensor 24 (Yes, in step S104), the CPU 100 determines whether the mobile phone is tilted or not (step S108). In the stop state of the mobile phone, acceleration of gravity is applied to the acceleration sensor 304. If the mobile phone is in a horizontal state, acceleration of gravity is detected only in one direction of three axial directions by the acceleration sensor 304. Meanwhile, if the mobile phone is tilted, acceleration of gravity is detected in any two of three axial directions by the acceleration sensor 304. For example, if the acceleration exceeds a predetermined threshold value at least in two directions, the CPU 100 determines that the mobile phone is tilted.

When the user holds the mobile phone in proximity to the ear, the mobile phone is tilted. Therefore, if the CPU 100 determines that the mobile phone is tilted (Yes, in step S108), the CPU 100 releases the mute mode (step S105).

Meanwhile, when the user accidentally brings a hand or a finger into proximity to the proximity sensor 24 when the mobile phone is on a desk or a table, since the mobile phone is in the horizontal state, the CPU 100 determines in step S108 that the mobile phone is not tilted (No, in step S108). Therefore, in this case, the mute mode is not released.

As described above, according to the second modified embodiment, since the mute mode is released only when the mobile phone is tilted, it is difficult for the mute mode to be accidentally released.

Meanwhile, in the second modified embodiment, the posture of the mobile phone is detected by using the acceleration sensor 304. However, the posture of the mobile phone may be detected by using a geomagnetic sensor.

Also, the second modified embodiment is added to the control processes of the first modified embodiment. In this case, the process of step S108 of the second modified embodiment shown in FIG. 5 may be added after the process of step S104 of the first modified embodiment shown in FIG. 4.

Third Modified Embodiment

Figure 6:
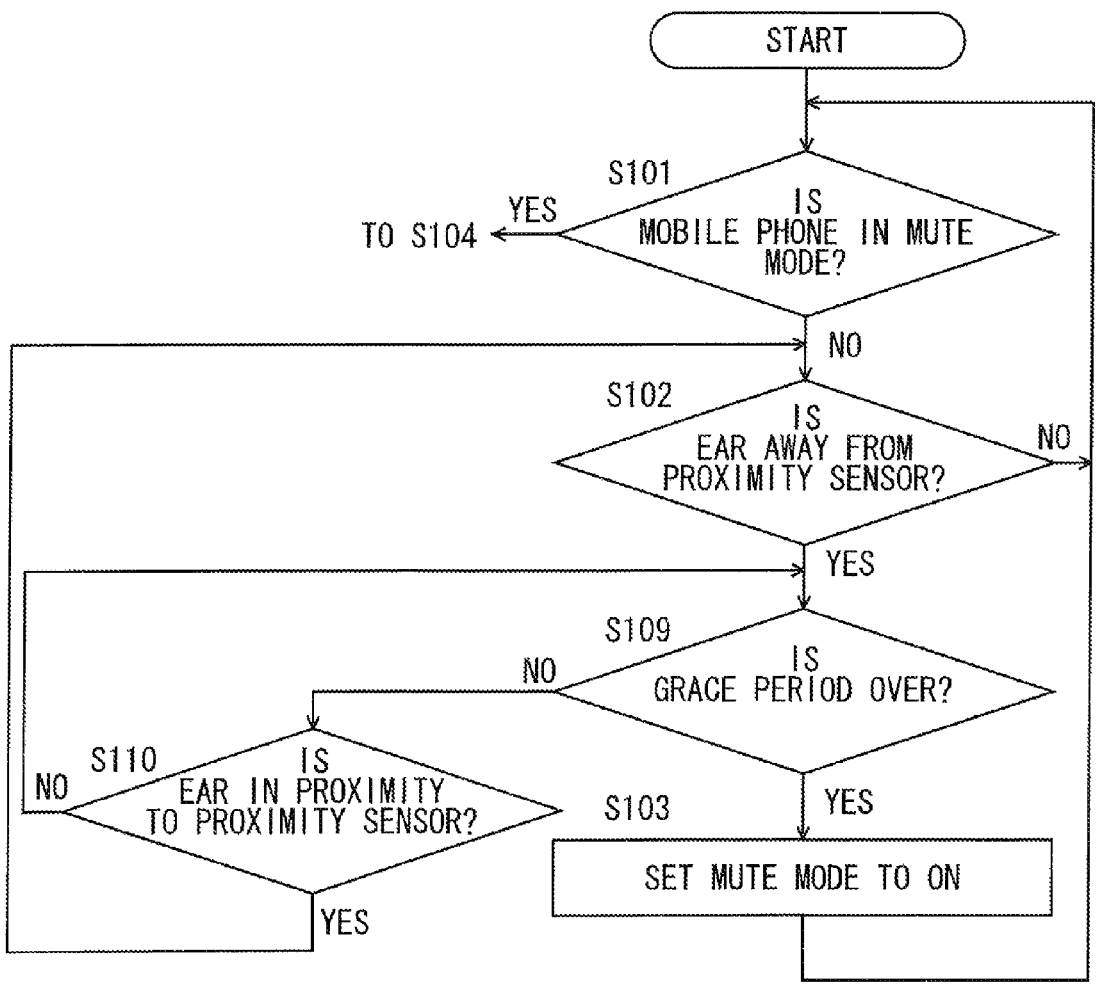
FIG. 6 is a flow chart illustrating a process sequence of control processes of an automatic mute function according to a third modified embodiment.

FIG. 6 is a flow chart illustrating a process sequence of control processes of an automatic mute function according to a third modified embodiment. Meanwhile, in the flow chart of FIG. 6, the same processes as those in the illustrative embodiment are denoted by identical step numerals. Further, the same steps S104 and S105 as those in the illustrative embodiment are omitted in FIG. 6.

In the third modified embodiment, control processes for switching from the normal mode to the mute mode are different from the illustrative embodiment.

If the CPU 100 determines in step S101 that the mobile phone is not in the mute mode (No, in step S101) and determines in step S102 that the ear is taken away from the proximity sensor 24 (Yes, in step S102), the CPU 100 determines whether a predetermined grace period is over (step S109). A grace period is counted from when the detection signal from the proximity sensor 24 is disappeared. For this determination, time counting is performed by the timer built in the CPU 100. While the grace period is not over (No, in step S109), the CPU 100 determines whether the ear is in proximity to the proximity sensor 24.

When the user accidentally keeps the ear away from the proximity sensor 24 without intending switch to the mute mode, the user immediately will bring the speaker 23 into proximity to the ear. Therefore, in this case, even when the ear is got away from the proximity sensor 24, the ear is detected by the proximity sensor 24 again in the grace period.

If the ear is detected by the proximity sensor 24 in the grace period (Yes, in step S110), the CPU 100 does not perform the switching to the mute mode, and returns to step S102 in which the CPU 100 determines whether the ear is taken away from the proximity sensor 24. At this moment, the time counting is stopped and the timer is reset.

Meanwhile, when the user keeps the call speaker 23 away from the ear for switch to the mute mode, the ear is taken away from the proximity sensor 24, and the grace period is over. Therefore, if the CPU 100 determines that the ear is taken away from proximity sensor 24 and the grace period is over (No, in step S110, and Yes, in step S109), the CPU 100 switches the mobile phone to the mute mode (S103).

As described above, according to the configuration of the third modified embodiment, even when the ear is taken away from the call speaker 23 for a moment, the mobile phone is not switched to the mute mode. Therefore, it is difficult for the mute mode to be accidentally executed.

Meanwhile, instead of the processes of steps S104 and S105 of the third modified embodiment, at least one of the control processes of the first modified embodiment and the control processes of the second modified embodiment may be applied.

Forth Modified Embodiment

Figure 7:
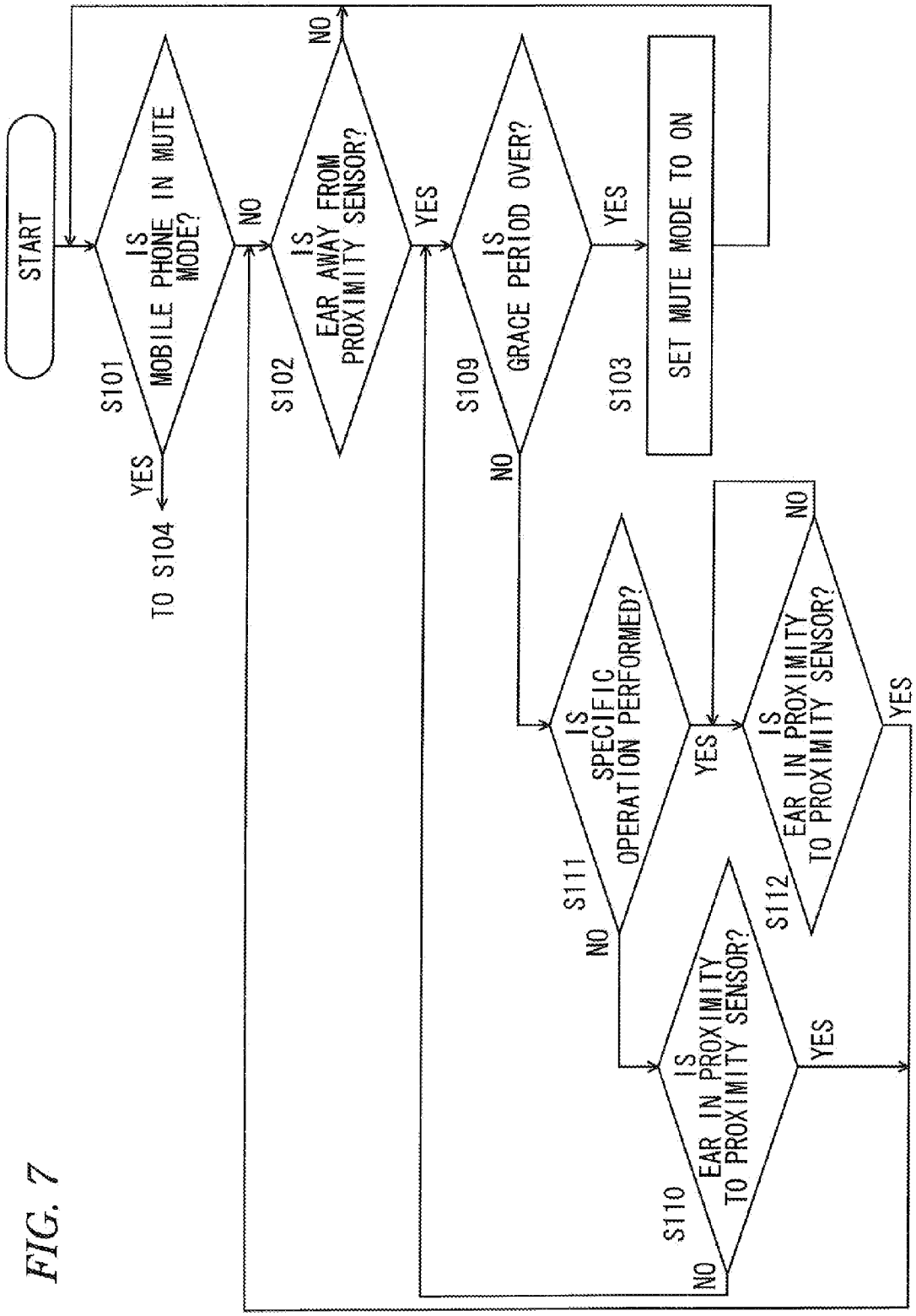
FIG. 7 is a flow chart illustrating a process sequence of control processes of an automatic mute function according to a fourth modified embodiment.

FIG. 7 is a flow chart illustrating a process sequence of control processes of an automatic mute function according to a fourth modified embodiment. Meanwhile, in the flow chart of FIG. 7, the same processes as those in the illustrative embodiment are denoted by identical step numerals. Further, the same steps S104 and S105 as those in the illustrative embodiment are omitted in FIG. 7.

Like the third modified embodiment, in the fourth modified embodiment, control processes for releasing the mute mode are different from the illustrative embodiment. Further, processes of steps S111 and S112 are added to the configuration of the third modified embodiment.

If the CPU 100 determines in step S101 that the mobile phone is not in the mute mode (No, in step S101), determines in step S102 that the ear is taken away from the proximity sensor 24 (Yes, in step S102), and determines in step S109 that the grace period is not over (No, in step S109), the CPU 100 determines whether predetermined specific operation has been performed (step S111).

Examples of the specific operation include operation of the user for adjusting the receiver volume, operation for displaying the phone number of the user, operation for starting the telephone directory function, operation for switching to a hands-free mode, etc. In short, these operations are operation performed after the mobile phone is first kept away from the ear during the telephone call, and when functions based on those forms of operation are being executed, switch to the mute mode is not required. Rather, in a case of the hands-free function, since the CPU 100 only switches an voice output destination from the call speaker 23 to the external speaker 310 so that the user can continue the telephone call without bringing the mobile phone into proximity to the ear, the mute mode should not be executed.

If the specific operation is performed in the grace period (Yes, in step S111), the CPU 100 detects and waits that the ear is brought again in proximity to the proximity sensor 24 without switch to the mute mode (step S112).

If the user finishes, for example, volume adjusting operation and brings the mobile phone into proximity to the ear again, the ear is detected by the proximity sensor 24. If the CPU 100 determines in step S112 that the ear is in proximity to the proximity sensor 24 (Yes, in step S112), the CPU 100 returns to step S102 in which the CPU 100 determines whether the ear is taken away from the proximity sensor 24. At this moment, the time counting for the grace period determination is stopped, and timer is reset.

As described above, according to the configuration of the fourth modified embodiment, even when the user keeps the mobile phone away from the ear to perform, for example, operation for adjusting volume, operation for displaying the phone number of the user, operation for switch to the hands-free mode, etc., if the user immediately performs these forms of operation, the mobile phone is not switched to the mute mode. Therefore, user-friendliness is improved.

Meanwhile, instead of the processes of steps S104 and S105 of the fourth modified embodiment, at least one of the control processes of the first modified embodiment and the control process of the second modified embodiment may be applied.

Fifth Modified Embodiment

Figure 8:
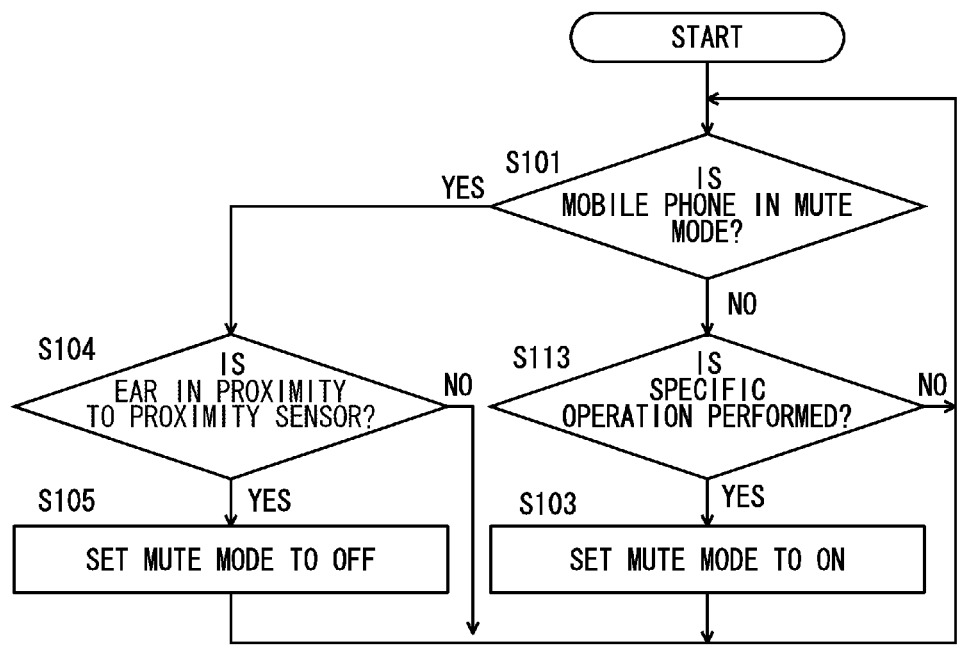
FIG. 8 is a flow chart illustrating a process sequence of control processes of an automatic mute function according to a fifth modified embodiment.

FIG. 8 is a flow chart illustrating a process sequence of control processes of an automatic mute function according to a fifth modified embodiment. Meanwhile, in the flow chart of FIG. 8, the same processes as those in the illustrative embodiment are denoted by identical step numerals.

Like the third modified embodiment and the fourth modified embodiment, in the fifth modified embodiment, control processes for releasing the mute mode are different from the illustrative embodiment. That is, in the fifth modified embodiment, switch to the mute mode is performed not based on ON or OFF of the proximity sensor 24, but based on the key operation. In this case, during the telephone call, one key of the operation key group 3a is assigned as a mute key for switching operation to the mute mode.

If the CPU 100 determines in step S101 that the mobile phone is not in the mute mode (No, in step S101), the CPU 100 determines whether the mute key has been operated or not (step S113).

In a case of switch to the mute mode, the user operates the mute key. If the CPU 100 determines that the mute key has been operated (Yes, in step S113), the CPU 100 switches the mobile phone to the mute mode (S103).

As described above, according to the configuration of the fifth modified embodiment, the switching to the mute mode is performed by key operation of the user. Therefore, it is difficult for the mute mode to be accidentally executed.

Meanwhile, instead of the processes of steps S104 and S105 of the fifth modified embodiment, at least one side of the control processes of the first modified embodiment and the control processes of the second modified embodiment may be applied.

Sixth Modified Embodiment

Figure 9:
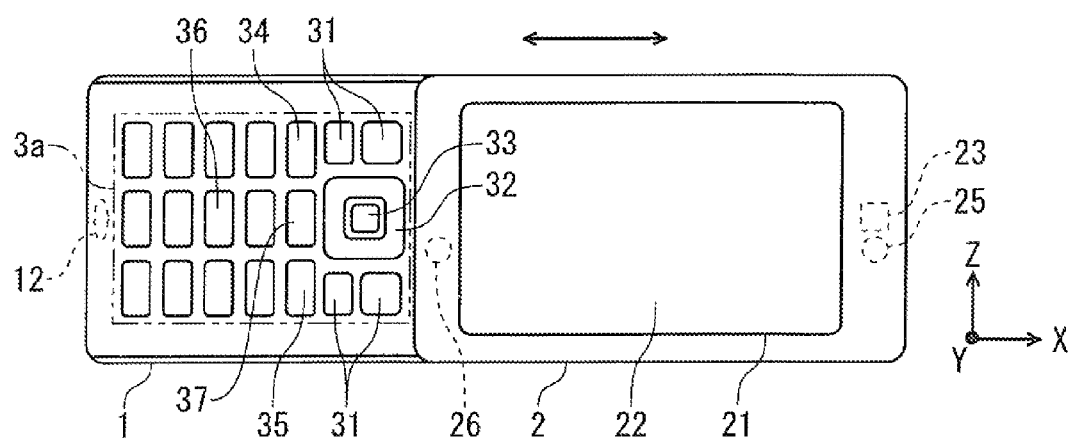
FIG. 9 is a configuration view illustrating a mobile phone according to a sixth modified embodiment.
Figure 10A:
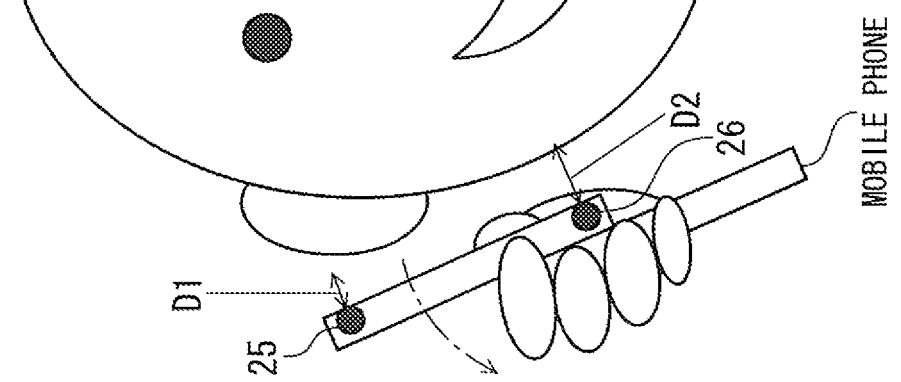
FIGS. 10A and 10B are views illustrating states in which a user is conducting a telephone call with holding the mobile phone to an ear according to the sixth modified embodiment.
Figure 10B:
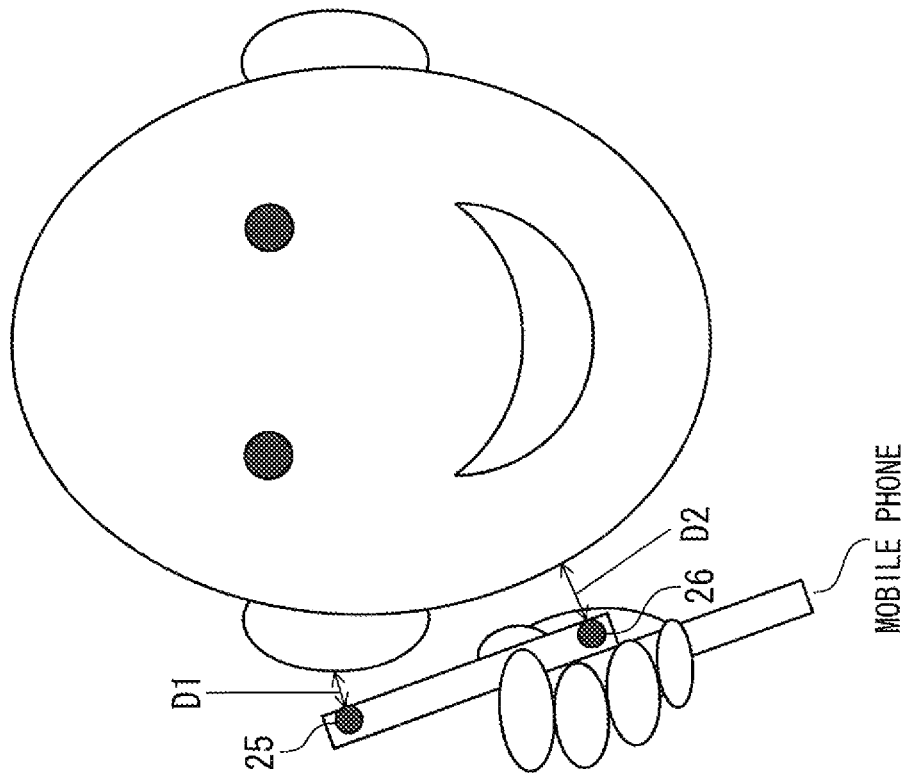
Figure 11:
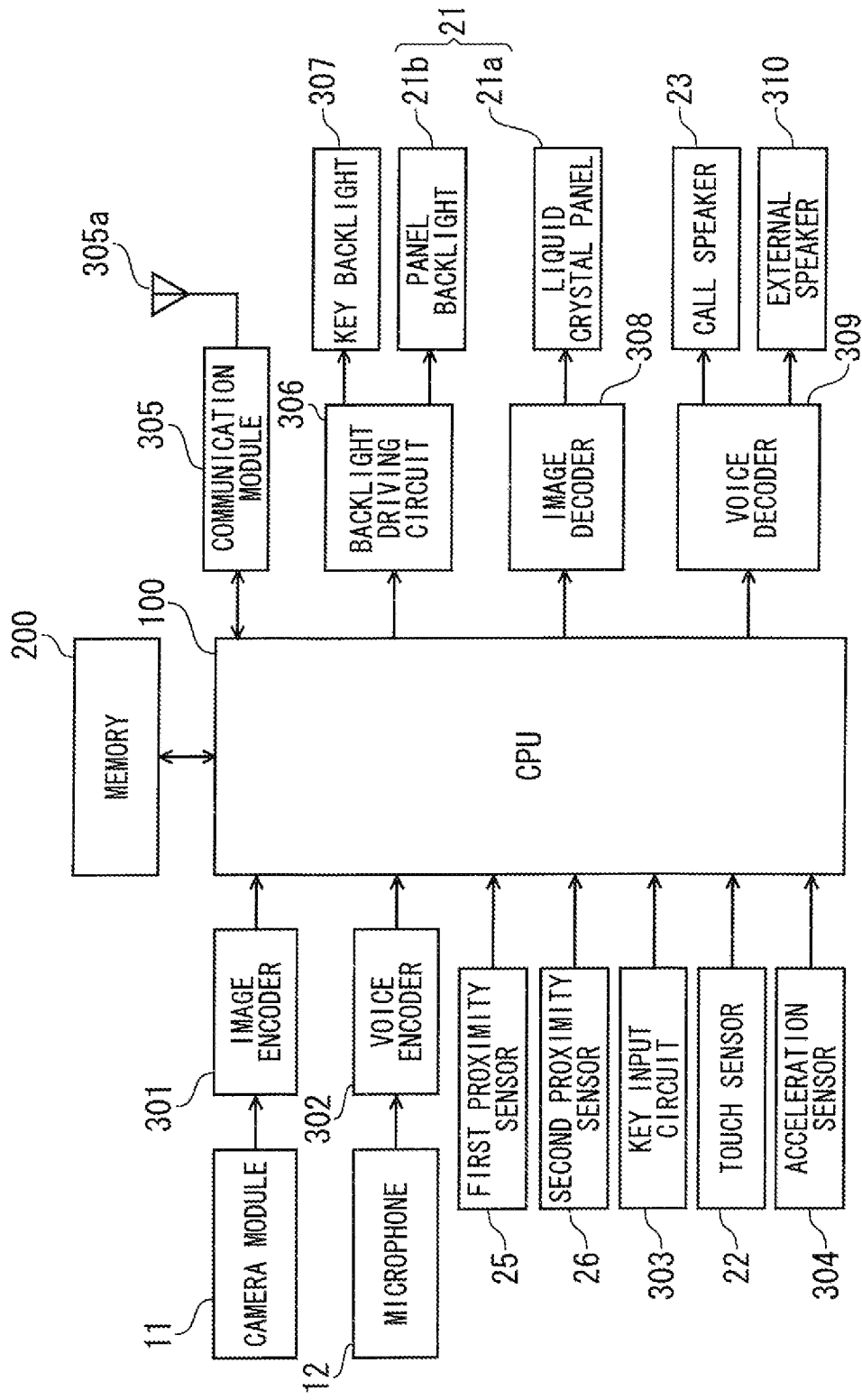
FIG. 11 is a block diagram illustrating an entire configuration of the mobile phone according to the sixth modified embodiment.

FIG. 9 is a configuration view illustrating an appearance of a mobile phone according to a sixth modified embodiment. FIGS. 10A and 10B are views illustrating states in which a user is conducting a telephone call with the mobile phone in proximity to an ear. FIG. 10A illustrates a state in which a first proximity sensor 25 is in proximity the ear, and FIG. 10B illustrates a state in which the first proximity sensor 25 is taken away from the ear. FIG. 11 is a block diagram illustrating an entire configuration of the mobile phone according to the sixth modified embodiment. Meanwhile, in FIGS. 9 and 11, the same components as those in the illustrative embodiment are denoted by identical symbols.

As shown in FIG. 9, in the sixth modified embodiment, the first proximity sensor 25 is disposed in the vicinity of the call speaker 23. Further, on the opposite side of the first proximity sensor 25 with interposing the display 21, a second proximity sensor 26 is disposed. The second proximity sensor 26 is disposed to be closer to the microphone 12 in an X-direction of FIG. 9 than the first proximity sensor 25.

The sensibilities of the first proximity sensor 25 and the second proximity sensor 26 are set so that a distance D2 (hereinafter, referred to as a detection distance D2) in which the second proximity sensor 26 detects a detection object is longer than a distance D1 (hereinafter, referred to as a detection distance D1) in which the first proximity sensor 25 detects a detection object, as shown in FIG. 10A. Therefore, even when a distance of the second proximity sensor 26 from the cheek of the user is longer than a distance of the first proximity sensor 25 from the ear, the second proximity sensor 26 detects the proximity of the cheek.

As shown in FIG. 11, the first proximity sensor 25 and the second proximity sensor 26 are connected to the CPU 100, and output detection signals to the CPU 100, respectively.

Figure 12:
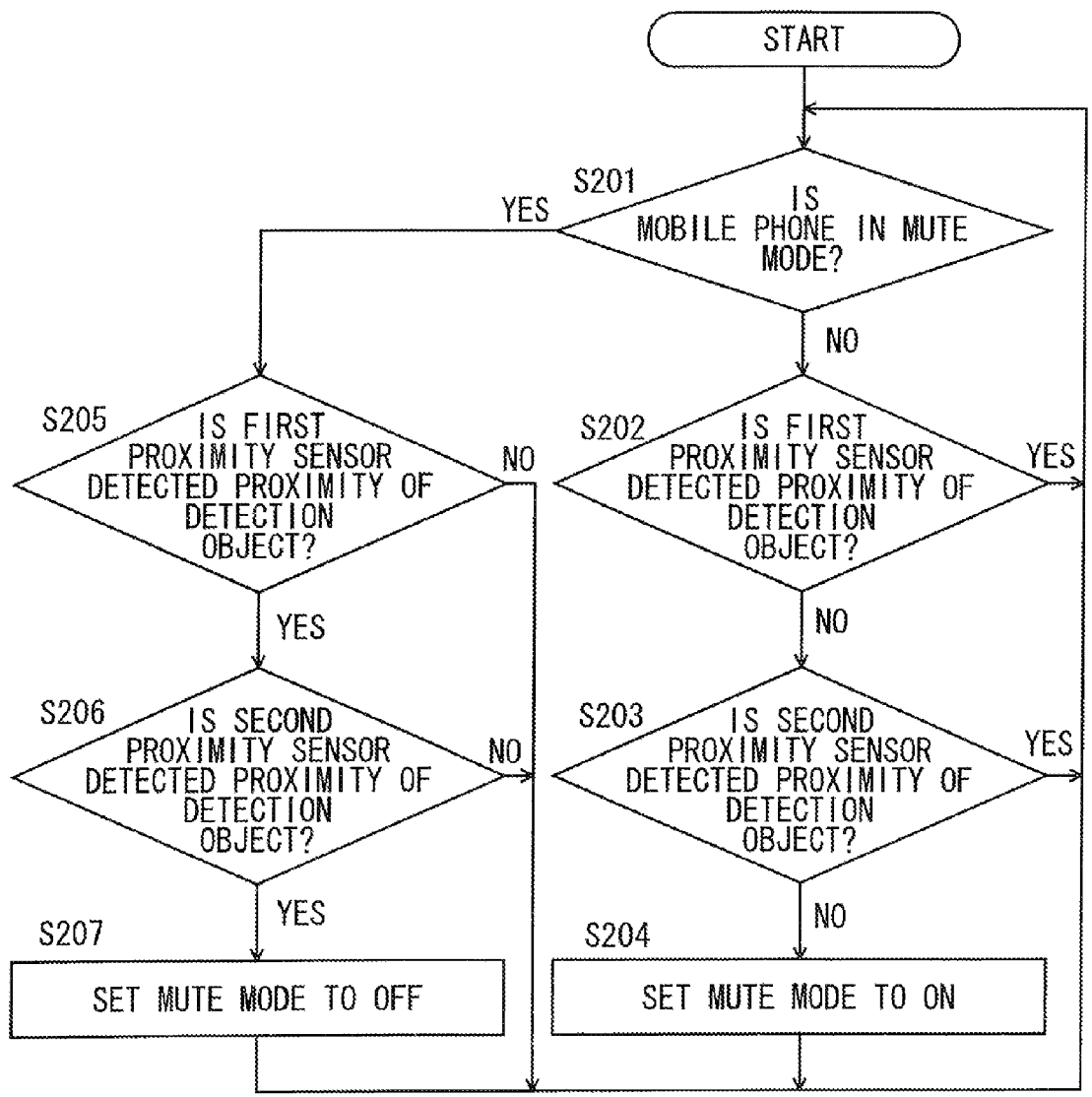
FIG. 12 is a flow chart illustrating a process sequence of control processes of an automatic mute function according to the sixth modified embodiment.

FIG. 12 is a flow chart illustrating a process sequence of control processes of an automatic mute function according to the sixth modified embodiment.

The CPU 100 first determines whether the mobile phone is in the mute mode or not (step S201). Then, if the CPU 100 determines that the mobile phone is not in the mute mode (No, in step S201), the CPU 100 determines whether the first proximity sensor 25 and the second proximity sensor 26 have detected each of the proximities of the detection objects (the ear and the cheek) (steps S202 and S203).

When the user keeps the ear slightly away from the call speaker 23 during the telephone call without intending switch to the mute mode, only the first proximity sensor 25 may be turned off and the second proximity sensor 26 maybe not turned off. For example, when the user moves a wrist so that the mobile phone is tilted toward the left as shown in FIG. 10B by a dashed-dotted arrow, only the first proximity sensor 25 is kept away from the ear and the second proximity sensor 26 is not easily kept away from the cheek.

Therefore, if any one of the first proximity sensor 25 and the second proximity sensor 26 detects the proximity of the detection object (Yes, in step S202 or S203), the CPU 100 keeps the normal mode.

Meanwhile, when the user keeps the mobile phone far away from the ear for switch to the mute mode, the ear is kept away from the first proximity sensor 25 and the cheek is also kept away from the second proximity sensor 26.

Therefore, if both of the first proximity sensor 25 and the second proximity sensor 26 have not detected the proximities of the detection objects (No, in step S202 and No in step S203), the CPU 100 switches the mobile phone to the mute mode (step S204).

After the mobile phone is switched to the mute mode, if the CPU 100 determines in step S201 that the mobile phone is in the mute mode (Yes, in step S201), the CPU 100 determinates whether the first proximity sensor 25 and the second proximity sensor 26 have detected the proximities of the detection objects (steps S205 and S206).

Even when a hand or a finger of the user is accidentally brought into contract with the second cabinet 2, since two proximity sensors 25 and 26 are at positions comparably spaced from each other with interposing the display 21, both of the first proximity sensor 25 and the second proximity sensor 26 will not detect the proximity of the hand or finger.

Therefore, if any one of the first proximity sensor 25 and the second proximity sensor 26 has not detected the proximity of the detection object (No, in step S205 or S206), the CPU 100 keeps the mute mode.

Meanwhile, if the user brings the mobile phone into proximity to the ear, as shown in FIG. 10A, the first proximity sensor 25 detects the ear, and the second proximity sensor 26 detects the cheek.

Therefore, if both of the first proximity sensor 25 and the second proximity sensor 26 detect the proximities of the detection objects (Yes, in step S205 and Yes, in step S206), the CPU 100 releases the mute mode (S207).

As described above, according to the configuration of the sixth modified embodiment, even when the first proximity sensor 25 in the vicinity of the call speaker 23 is accidentally kept away from the ear, if the second proximity sensor 26 is in proximity to the cheek, the mobile phone is not switched to the mute mode. Therefore, it is difficult for the mute mode to be accidentally executed.

Moreover, according to the configuration of the sixth modified embodiment, even when a hand or a finger is accidentally brought into proximity to any one proximity sensor 25 or 26, the mute mode is not released. Therefore, it is difficult for the mute mode to be accidentally executed.

Meanwhile, at least one control process of the first modified embodiment to the fourth modified embodiment may be additionally applied to the sixth modified embodiment. Also, instead of the processes of steps S202 and S203, the process of step S113 (see FIG. 8) of the fifth modified embodiment may be applied.

Other Modified Embodiments

Since the ear of the user and the call speaker 23 of the mobile phone are fully closed to each other and they are easily detected during the telephone call, in the illustrative embodiment, the proximity sensor 24 is disposed in the vicinity of (around) the call speaker 23 to detect that the ear is in proximity to the proximity sensor 24. However, the present invention is not limited thereto. Since the cheek of the user is also brought into proximity of the mobile phone, the proximity sensor 24 may be disposed at a portion of the second cabinet 2 or the first cabinet 1, to which the cheek is likely to come into proximity, to detect that the cheek is in proximity to the proximity sensor 24.

Further, in the illustrative embodiment, if the mobile phone is switched to the mute mode, the CPU 100 turns off the microphone 12. However, the present invention is not limited thereto. In the mute mode, the microphone 12 may be in an ON state, and the voice encoder 302 may not output voice data to the CPU 100. Alternately, in the mute mode, the CPU 100 may not output voice data to the communication module 305.

Furthermore, in the illustrative embodiment, it is detected that the ear, etc., is in proximity to the mobile phone by the proximity sensor 24. However, the present invention is not limited thereto. The touch sensor 22 may be used for the detection of the object. In this case, during a telephone call, a key input by the touch sensor 22 is prohibited, and a key input is performed only by the operation key group 3a. Further, when the touch sensor 22 is used for detection of the object, the proximity sensor 24 may be omitted, or the touch sensor 22 is used as a additional the second proximity sensor 26.

Moreover, it is preferable that a detection distance, in which the proximity of the ear, etc., is detected, is greater than a detection distance, in which a key input is detected. Accordingly, it is not immediately detected that the ear, etc., is taken away from the mobile phone by the touch sensor 22, and it is difficult for the mute mode to be accidentally executed. Therefore, it is preferable that a detection distance of the touch sensor 22 is switched by a control signal, etc., from the CPU 100.

Figure 13:
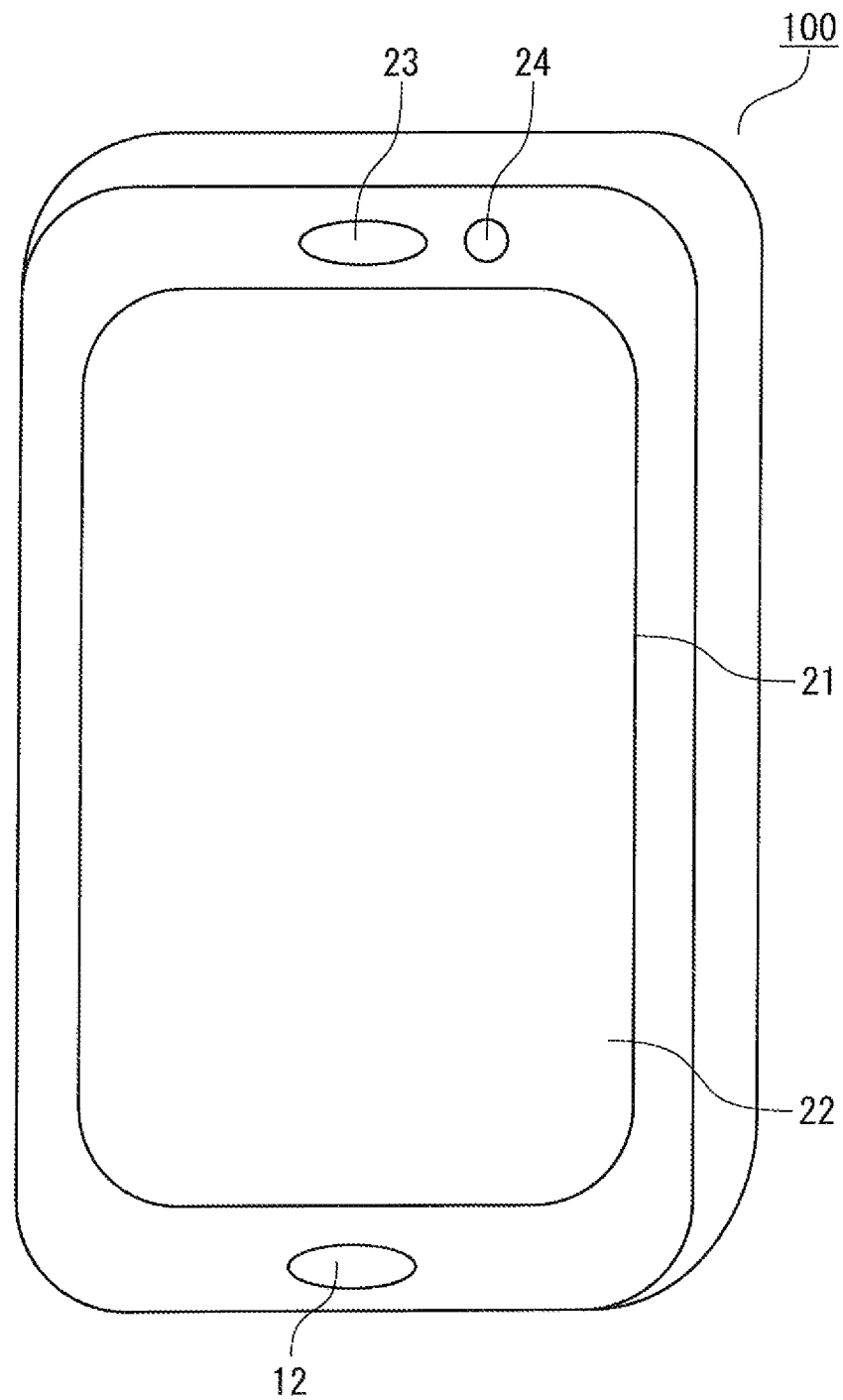
FIG. 13 is a configuration view illustrating an appearance of a straight-type mobile phone according to the illustrative embodiment.

Also, in the illustrative embodiment, the present invention is applied to the so-called slide-type mobile phone. However, the present invention is not limited thereto. The present invention may be applied to any types of mobile phones such as a so-called folding-type mobile phone, a straight-type mobile phone, etc. For example, similar to the slide-type mobile phone, a straight-type mobile phone 100 as shown in FIG. 13 includes a microphone 12, a display 21, a touch sensor 22, a call speaker 23, and a proximity sensor 24. The straight-type mobile phone 100 can be applied the above-described modified embodiments, and the touch panel is used for the detection of the object.

The mobile terminal apparatus of the present invention is not limited to a mobile phone, but may be a personal digital assistant (PDA) and the like.

The illustrative embodiment of the present invention can be modified appropriately and variously within the scope of the present invention.

What is claimed is:

1. A mobile terminal apparatus comprising:
   a microphone;
   a switch control unit, which switches between a normal mode, in which a voice uttered toward the microphone is transmitted to a intended party, and a mute mode, in which the voice is not transmitted to the intended party; and
   a proximity sensor, which detects whether a detection object is in proximity to the proximity sensor,
   wherein, immediately after a start of a telephone call, the normal mode is executed until the first detection of the detection object by the proximity sensor, and when the detection object is no longer detected, the switch control unit switches to the mute mode, and
   wherein, while the mute mode is being executed, if the detection object is again detected by the proximity sensor, the switch control unit switches back to the normal mode.

2. The mobile terminal apparatus according to claim 1, further comprising:
   a condition detecting unit, which detects a condition of the mobile terminal apparatus, wherein the switch control unit switches to the normal mode based on the condition detected by the condition detecting unit.

3. The mobile terminal apparatus according to claim 1, further comprising:
   a movement detecting unit, which detects a movement of the mobile terminal apparatus,
   wherein, after the movement detecting unit detects the movement of the mobile terminal apparatus, if the detection object is detected by the proximity sensor, the switch control unit switches to the normal mode.

4. The mobile terminal apparatus according to claim 1, further comprising:
   a posture detecting unit, which detects a posture of the mobile terminal apparatus, wherein, after the posture detecting unit detects that the mobile terminal apparatus is tilted more than a predetermined angle, if the detection object is detected by the proximity sensor, the switch control unit switches to the normal mode.

5. The mobile terminal apparatus according to claim 1, wherein the proximity sensor includes a first detector and a second detector disposed at a position different from the first detector, and
   wherein, only if both of the first detector and the second detector detect the detection object, the switch control unit switches to the normal mode.

6. The mobile terminal apparatus according to claim 5, further comprising:
   a speaker, which output a voice transmitted from the intended party,
   wherein the first detector is disposed around the speaker, and the second detector is disposed to be closer to the microphone than the first detector, and
   wherein, when both of the first detector and the second detector do not detect the detection objects, the switch control unit switches to the mute mode.

7. The mobile terminal apparatus according to claim 1, further comprising:
   an operating unit provided to perform a switch operation to switch to the mute mode, wherein, if the switch operation is performed, the switch control unit switches to the mute mode.

8. The mobile terminal apparatus according to claim 1, wherein, while the normal mode is being executed, if the proximity sensor detects that the detection object is taken away from the proximity sensor for a predetermined time, the switch control unit switches to the mute mode.

9. The mobile terminal apparatus according to claim 8, wherein, even when the predetermined time is over, if a specific operation is performed before the predetermined time is over, the switch control unit does not switch to the mute mode.

* * * * *